Aug. 28, 1962 S. R. COLOSIMO 3,051,211
TRACTION DEVICE
Filed Oct. 31, 1961
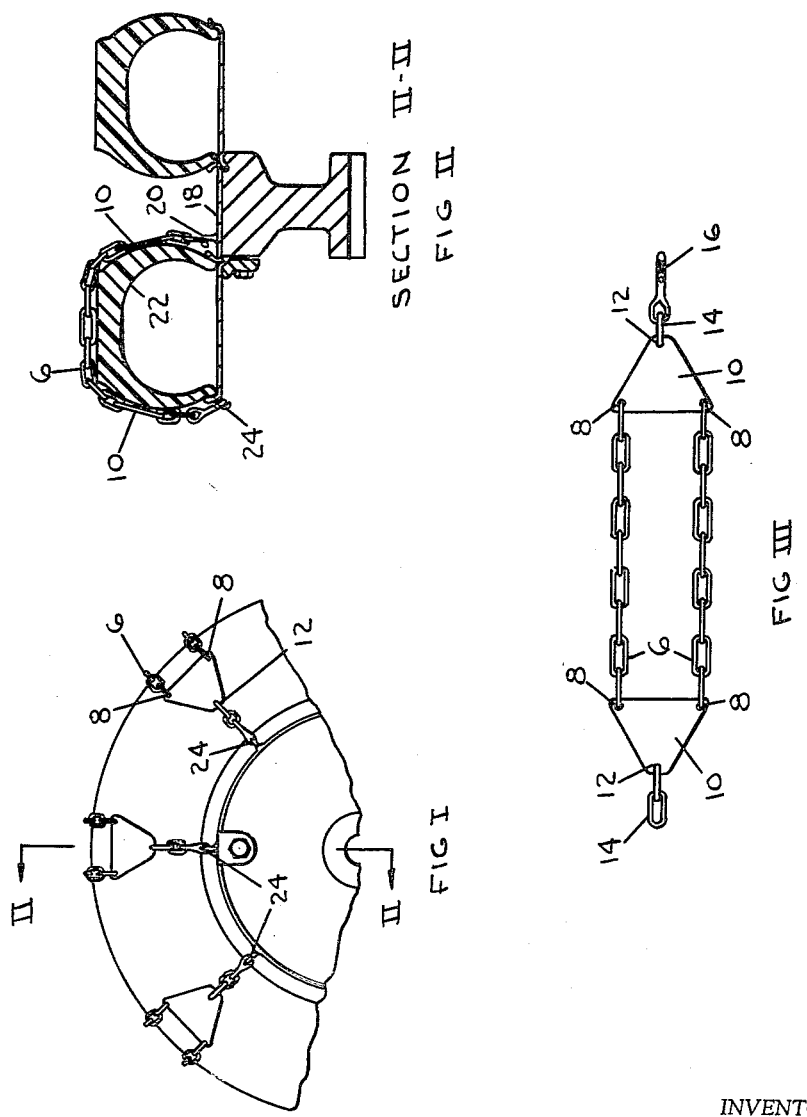
INVENTOR.
SAMUEL R. COLOSIMO
BY
ATTORNEY

3,051,211
TRACTION DEVICE
Samuel R. Colosimo, 1025 Bluff St., Pittsburgh, Pa.
Filed Oct. 31, 1961, Ser. No. 149,021
2 Claims. (Cl. 152—220)

This invention relates to tire chains, and specifically to tire chains for the driving wheels of heavy trucks.

In accordance with the prior art, of which I am aware, tire chains comprise circumferential runner chains that run around along both the inside and outside sidewalls of tires, and cross links that run across the tread of the tires connecting the inside circumferential chain with the outside circumferential chain. These chains are mounted by laying the chain over the tire and joining the inside circumferential chain to itself with a clamp and joining the outside circumferential chain to itself with a clamp so that each circumferential chain is joined in a circle of sufficiently small diameter that it cannot slide up and over the tread of the tire. It is difficult and nasty work to fasten tire chains onto a tire, especially if a vehicle is already mired in mud, or in deep snow, or if the weather is cold and inclement. Mounting chains on truck tires is especially difficult due to the size and weight of the chain and the cumbersome size of the truck tire. One of the most difficult parts of mounting tire chains is to get the cross links positioned under the tire (where it contacts the ground) without tangling up the chain.

Ideally, the tire chain should be able to be mounted by a person without assistance, such as a driver on the road, and the job should be able to be done quickly to reduce the discomfort of bad weather and working in a difficult environment. A tire chain should be able to be mounted to the wheel without having to try to position the chain, then run back and try to operate the vehicle to move it over the chain, or to try to spin the wheel to swing some of the chain underneath the tire where it contacts the ground.

It is accordingly an object of my invention to provide tire chains for heavy trucks that can be mounted quickly and easily by a single man remaining at the tire, without having to move the truck or spin the wheel.

It is another object of my invention to provide tire chains that can be removed quickly and easily when they are no longer needed.

It is another object of my invention to provide a means for mounting tire chains, said means that can be provided on the wheels of a truck or other vehicle in the shop or garage and that make it easy for mounting the actual chains on the road when they are needed.

It is an ancillary object of my invention to provide an improved article of manufacture.

In the preferred embodiment of my invention I provide mounting hooks that are welded to the metal cylinder communicating between the two dual rear wheels of a truck. Mounting hooks also are welded to the exterior rim of the outside wheel of a set of dual rear wheels of a truck. These hooks provide a ready means for fastening sections of chain to both the inside and outside of the outside tire, the chain being drawn across the tread of the tire. Each chain section comprises a pair of chain lengths extending across the tread and joined by a triangular piece of metal to a fastening apparatus that hooks onto the hooks that are welded inside and outside of the outside tire.

The novel features that I consider characteristic of my invention are set forth with particularity in the appended claims. The invention, itself, however, both as to its organization and its method of operation, together with additional objects and advantages thereof, will best be understood from the following description when read in connection with the accompanying drawing in which:

FIGURE 1 is a view in elevation of the exterior of the truck tire as seen looking toward the truck.

FIGURE 2 is an elevation in cross section of the upper portion of a set of dual tires commonly used as driving wheels for a truck.

FIGURE 3 is a view in plan of one chain section.

In accordance with the preferred embodiment of my invention I provide a pair of cross-link chains 6, said cross links being the chain that crosses over the tread of the tire and is interposed between the tire and the surface of the ground to improve the traction of the tire. Each end 8 of the pair of cross links 6 connect to the corner 8 of a metal triangle 10. The third corner 12 of said triangle 10 extends away from the cross links 6. This third corner 12 is joined to an extension chain 14 and snap ring 16 which is used to mount the chain to the wheel.

The smooth inside metal cylindrical ring 18 of a set of dual tires has no provision or projection that could be used to mount chains. Therefore, I provide a metal hook 20 welded to the metal cylinder 18 that communicates between the two tires commonly used as a pair in a set of dual tires. A number of these metal hooks 20 are welded around said metal cylinder close to the position of the inner rim of the outer tire 22.

On the very outside rim of the outer tire 22 of the set of dual tires I provide additional metal hooks 24 welded onto the outside rim. A number of these metal hooks 24 are welded, each outside hook 24 apposing the position of each metal hook 20 that is welded between the two tires of the dual tire set. This provides metal hooks welded firmly to metal sections of the driving dual tires of a truck with the shortest distance possible between the metal rings passing over the tread of the outside tire.

One end of each chain section is hooked onto the metal hook 20 that is welded to the metal cylinder. The snap ring 16 is hooked onto the metal hook 24 welded onto the outside rim of the outside tire.

The driver or operator of a truck now needs only to reach across the tread of the outer tire of his driving dual tires and hook one end of the chain section 14 to the inside hook 20 and then draw the chain section across the tread of the outer tire of the dual set and hook the snap ring 16 to the metal hook 24 that has been welded to the outside rim. The operator can repeat this, fastening on as many chain sections as he wishes, until he has used up all the positions provided by the hooks welded on his wheels. It is expected that approximately six such positions will be sufficient in most cases.

In another embodiment of my invention I provide metal hooks with both ends welded to the wheel cylinder 20 and to the outside wheel rim 24 thus providing a closed metal ring for fastening. A snap ring 16 is provided on both ends of the chain section 14 for fastening the chain section.

In yet another embodiment of my invention, I provide welded hooks 20, 24, but no snap ring 16. The triangular spacers 10 at each end of the pair of cross links 6 are made of a sturdy, elastic material that will stretch enough to permit fastening a link of the extension chain onto the welded hook and that will maintain tension in the mounted chain section.

Although I have shown and described specific embodiments of my invention, I am aware that other modifications thereof are possible; my invention, therefore, is not to be restricted except insofar as is necessitated by the prior art and the spirit of the invention.

I claim as my invention:

1. In combination a plurality of chain sections and hooks welded to an outside wheel of a pair of rear dual vehicle wheels and to a metal cylinder between said dual wheels, each of said chain sections comprising a pair of cross links joined at each end to two corners of equilateral metal triangles, one triangle at each end of said pair of cross links, the remaining corner of each of said triangles joined to an extension chain, at least one extension chain terminating in a snap ring, one end of the other extension chain being secured onto one of said hooks welded to said metal cylinder communicating between said rear dual wheels, said snap ring being secured to another of said hooks, welded to the outside rim of said outside wheel of said dual wheels, said hooks being welded on said metal cylinder and said outside wheel being located at several positions around said rear dual wheels.

2. Apparatus as described in claim 1 characterized in that the said triangles are constructed of an elastic material.

References Cited in the file of this patent

UNITED STATES PATENTS

| | | |
|---|---|---|
| 1,223,724 | Otto | Apr. 24, 1917 |
| 1,237,369 | Murray | Aug. 21, 1917 |
| 1,390,893 | Elliott | Sept. 13, 1921 |
| 2,183,321 | Jackson | Dec. 12, 1939 |
| 2,344,972 | Copp | Mar. 28, 1944 |
| 2,474,521 | Fogarty | June 28, 1949 |
| 2,624,388 | Kane | Jan. 6, 1953 |

FOREIGN PATENTS

| | | |
|---|---|---|
| 50,891 | France | Jan. 9, 1941 |

(3rd addition of 816,343)